(12) United States Patent
Simons et al.

(10) Patent No.: US 6,230,143 B1
(45) Date of Patent: May 8, 2001

(54) SYSTEM AND METHOD FOR ANALYZING COUPON REDEMPTION DATA

(75) Inventors: Peter J. Simons, Farmington Hills; Andrew F. Bennett; Glenn S. Morgan, both of Livonia; William J. Ray, Okemos, all of MI (US)

(73) Assignee: Valassis Communications, Inc., Livonia, MI (US)

( * ) Notice: Subject to any disclaimer, the term of this patent is extended or adjusted under 35 U.S.C. 154(b) by 0 days.

(21) Appl. No.: 09/189,548

(22) Filed: Nov. 11, 1998

Related U.S. Application Data
(60) Provisional application No. 60/065,143, filed on Nov. 12, 1997.

(51) Int. Cl.[7] ........................................... G06F 17/60
(52) U.S. Cl. ............................................................. 705/14
(58) Field of Search ................................. 705/1, 10, 14, 705/16, 22, 26, 27, 28

(56) References Cited

U.S. PATENT DOCUMENTS

| | | | |
|---|---|---|---|
| 4,791,281 | 12/1988 | Johnsen et al. | 705/14 |
| 4,908,761 | 3/1990 | Tai | 705/14 |
| 5,353,218 | * 10/1994 | De Lapa et al. | 705/14 |
| 5,393,965 | * 2/1995 | Bravman et al. | 235/383 |
| 5,420,409 | 5/1995 | Longacre, Jr. et al. | 235/462.01 |
| 5,463,214 | 10/1995 | Longacre, Jr. et al. | 235/462.11 |
| 5,557,721 | 9/1996 | Fite et al. | 705/14 |
| 5,569,902 | 10/1996 | Wood et al. | 235/462.48 |
| 5,591,956 | 1/1997 | Longacre, Jr. et al. | 235/462.1 |
| 5,612,527 | 3/1997 | Ovadia | 315/293 |

(List continued on next page.)

FOREIGN PATENT DOCUMENTS 0 681 248 A2 * 8/1995 (EP) ......................... G06F/17/60

OTHER PUBLICATIONS

Brothers, Tom, "2D Bar Codes Create New Opportunities", Automatic I.D. News, vol. 13, Issue 7, pg 36, Jun. 1997.*
Moore, Bert et al, "EAN/UCC Create New Small Item–Marking Technologies", Automatic I.D. News Europe, vol. 14, Issue 9, pg 1, Aug. 1998.*

(List continued on next page.)

*Primary Examiner*—James P. Trammell
*Assistant Examiner*—John W. Hayes
(74) *Attorney, Agent, or Firm*—McDermott, Will & Emery

(57) ABSTRACT

A system and method for analyzing coupon redemption data, includes a parallel adaptive, self-arborizing network having a database component with a database containing consumer and client information, an extract module program that retrieves information from the database based on a set of user or computer designed criteria, an editor program which formats the information extracted from the database to be generated on a coupon or flyer to create a data template including at least one two dimensional bar code containing consumer and coupon information from the database, and a printing tool for encoding the data template on a coupon page. The system further includes a data recovery system, including at least one scanning device provided at the point of sale terminal adapted to read the two dimensional bar codes on the coupons and a store and forward system that stores the data collected by the scanning device at the point of sale terminal. The data redemption system includes a data accumulator that retrieves redeemed coupon information from the store and forward system in the retail client's store, which is transferred to a database analysis component of the parallel adaptive network via an Internet or similar modem communications transfer. The database analysis component of the parallel adaptive network analyzes the consumer and client information from the redeemed coupon data to determine consumer purchasing trends. The database analysis component learns from the analysis of consumer purchasing trends to define a modified set of coupon printing criteria based on the analysis.

26 Claims, 9 Drawing Sheets

U.S. PATENT DOCUMENTS

| | | | |
|---|---|---|---|
| 5,708,782 | | 1/1998 | Larson et al. .......................... 705/14 |
| 5,710,886 | | 1/1998 | Christensen et al. .................. 705/14 |
| 5,761,648 | | 6/1998 | Golden et al. ......................... 705/14 |
| 5,825,006 | * | 10/1998 | Longacre, Jr. et al. ......... 235/462.27 |
| 5,832,457 | * | 11/1998 | O'Brien et al. ........................ 705/14 |
| 5,855,007 | | 12/1998 | Jovicic et al. ......................... 705/14 |
| 5,877,485 | * | 3/1999 | Swartz ................................. 235/383 |
| 5,907,830 | * | 5/1999 | Engel et al. ........................... 705/14 |
| 5,913,542 | * | 6/1999 | Belucci et al. ........................ 283/75 |
| 5,924,080 | * | 7/1999 | Johnson ................................ 705/26 |
| 5,948,061 | * | 9/1999 | Merriman et al. .................. 709/219 |
| 5,956,694 | * | 9/1999 | Powell .................................. 705/14 |
| 5,962,829 | * | 10/1999 | Yoshinaga ........................... 235/375 |
| 6,014,634 | * | 1/2000 | Scroggie et al. ...................... 705/14 |
| 6,026,370 | * | 2/2000 | Jermyn ................................. 705/14 |
| 6,035,280 | * | 3/2000 | Christensen .......................... 705/14 |
| 6,076,068 | * | 6/2000 | DeLapa et al. ....................... 705/14 |

OTHER PUBLICATIONS

Agrawal et al,, "Market Share Forecasting: An Empirical Comparison of Artificial Neural Networks and Multinimial Logit Model," Journal of Retailing, vol. 72, No. 4, Winter 1996.*

Freeman et al., "Modelling Methodology. Basics to Neural Nets—A Return to Ignorance?", Journal of the Market Research Society, vol. 36, No. 1, Jan., 1994.*

Colwell, Lynne H., "Promoting For Pennies," Home Office Computing, vol. 11, No. 4, Apr. 1993.*

* cited by examiner

Peter Simons
29632 Harrow Dr.
Farmington, MI 48331 — 29

— 70

SYSTEM AND METHOD FOR ANALYZING COUPON REDEMPTION DATA

CROSS-REFERENCE TO RELATED APPLICATIONS

This application claims priority to U.S. provisional application Ser. No. 60/065,143, filed Nov. 12, 1997.

TECHNICAL FIELD

This invention relates to a system for generating coupon data and a method for redeeming and analyzing coupon redemption data to determine consumer purchasing trends.

BACKGROUND ART

Coupons and discounted flyers are used by manufacturers and retailers as an incentive to prospective and current consumers to purchase products made or sold by the manufacturers or retailers. Manufacturers offer price reductions to consumers to induce the consumer to purchase their product rather than a similar product produced by a competitor. Retailers use the coupons to entice consumers to purchase the same products from their stores rather than one of their competitor's outlets.

Coupons are distributed in any number of ways. The most common methods of distribution include in-store flyers, on-product delivery, magazine and newspaper delivery, and direct mailings. It has become advantageous for retailers to use direct marketing firms rather than in-house employees to advertise their products in local markets. Part of the direct market retailers advertising efforts include gathering consumer information.

The direct marketing firms will conduct marketing consumer advertising surveys for the retailers to determine, among other characteristics, gender, age, marital status, household income and product needs. Collecting this data, using primarily either written or telephonic surveys, direct marketing firms can target specific products to specific consumers of retailers, providing price reductions to target consumers and cost savings to the retailers by reducing the printing costs of coupons by reducing the number of potentially unredeemed coupons.

Direct marketing firms are primarily interested in determining the number and type of coupons redeemed by consumers after the purchase of the discounted products. This allows the marketing firms to provide retailers information about which products are desirable to shoppers based on the number of coupons redeemed and in which stores the coupons are redeemed. Additionally, direct marketing firms would be able to provide specific coupons to consumers who redeem certain types of coupons for products based on a review of the quantity and type of coupons redeemed.

Most coupons currently include, in addition to a textual advertising message, a uniform product code (UPC) bar code. The UPC bar code used is generally a one dimensional linear bar code. This linear bar code provides information about the manufacturer and brand of the product being discounted, the type of product being discounted, and the amount of discount being provided to the consumer by the coupon. The bar codes on the coupons are designed to be scanned at the time of purchase of the goods such that the point of sale terminal may verify that the coupon is valid and is being redeemed for a purchased product.

Several methods have been proposed to track redemption data by direct marketing firms to generate coupons for target consumers based on purchasing information gathered after the coupons have been used. One method of generating coupons and tracking consumer redemption information after the sale is disclosed in U.S. Pat. No. 4,908,761 issued to Tai. The Tai '761 patent discloses a system for identifying product purchasers and determining purchasing patterns using scannable stickers that can be affixed to the purchased product. The stickers include a linear uniform product code (UPC) bar code that includes data such as the type of product, size, and price of discount of the coupon. Also included in the bar code is a consumer personal identification number (PIN), which can be tracked to determine which consumers are redeeming particular coupons.

This method of gathering coupon redemption data has not been an effective method of determining consumer purchasing patterns. One of the problems with this method is that standard bar code scanners will only read a portion of the bar code and ignore the rest. As a result, the sales representative must run the coupon through the scanner twice: once for the coupon identification code and once for the consumer identification code. Often, the coupon is scanned only once by the sales representative, making the redemption of data from the coupons impractical. Additionally, the amount of information that marketing firms want to include in the bar code causes the redemption sticker to be larger than the space available on the coupon.

Another type of coupon redemption analysis system is disclosed in U.S. Pat. No. 4,791,281 issued to Johnsen et al. The Johnsen '281 patent discloses a system for encoding and decoding documents which are used for the validation, tracking and correlation of data. A unique one dimensional linear bar code is printed by the system on a coupon detailing information about the product, manufacturer, issuer and discount value. A second linear bar code is applied to the coupon detailing the name and address of the coupon recipient. When the coupon is redeemed by the consumer, a scanner at the retail client's point of sale terminal scans the bar codes on the coupon. The information from the bar codes are downloaded into the store's main computer, where the information can be downloaded at a later time for analysis.

The Johnsen '281 patent does not disclose a method for analyzing the data once collected to determine consumer trends. The Johnsen patent also does not disclose a method for transferring the data from the store's computer to the off-site database for real time analysis. Additionally, the Johnsen '281 patent requires the sales representative to scan the coupon twice to gather both product and consumer data, which is an imprecise method for gathering the data.

Another example of a system for generating and redeeming product discount coupons is disclosed in U.S. Pat. No. 5,353,218 to De Lapa et al. The De Lapa '218 patent discloses a focused coupon system wherein both consumer and coupon data are encoded as one dimensional linear bar codes on coupons that can be read by point of sale scanners in the retail client's store. After the coupon has been scanned, the data is uploaded to the store's main computer, where it is eventually transferred back to the main computer containing the data redemption database. The '218 patent further discloses the use of a generic string of code that is inserted into the data record if the scanner is unable to scan the consumer information into the record. This system does not disclose the use of two dimensional bar coding or a method for analyzing consumer purchasing trends from the uploaded coupon data. Additionally, the system fails to pinpoint which consumers redeem specific coupons by inserting a generic data code rather than requiring matching consumer and product data codes.

SUMMARY OF THE INVENTION

Therefore, it is an object of the present invention to provide a coupon generating and data redemption system including a method for analyzing the consumer and product information gathered from the redemption data.

It is another object of the invention to provide a method for analyzing coupon redemption data wherein the analyzing database component is a neural network which analyzes consumer purchasing trends and modifies the coupon generation system to adapt to the purchasing habits of the consumer, allowing the database to learn purchasing behaviors as it grows.

It is yet another object of the invention to provide a system for generating coupons wherein a two dimensional bar code is encoded on the coupon to provide detailed consumer and product information to be analyzed by the system without sacrificing additional coupon space.

It is a further object of the invention to provide a system and method for analyzing coupon redemption data wherein data gathered from the point of sale terminals is transferred via a communications network to the consumer and product database, increasing the speed and accuracy with which data is returned to the system.

Therefore, according to the present invention, a system and method for analyzing redemption data is provided to allow direct marketers and their client organizations to more directly identify individuals who are coupon users, differentiate those users product preferences and price/offer sensitivity levels and more directly focus promotional dollars at those individuals.

The coupon data redemption system includes a database component containing consumer information and corresponding client coupon information, an extract module program that retrieves information from the database based on a set of user or computer designed criteria, an editor program which formats the data to be generated on a coupon or flyer and a printing tool for encoding a two dimensional bar code containing relevant consumer and coupon information from the database. The system further comprises a coupon data recovery system, including a scanning device provided at the point of sale terminal adapted to read the two dimensional bar codes on the coupons and a store and forward system that stores information collected by the scanning device at the point of sale terminal. In another embodiment of the invention, the data recovery system can include a store point of sale comparison device that will include additional demographic information from the retailer not included in the bar coded information.

The data redemption system further includes a neural network that retrieves information using a data accumulator to retrieve data from the store and forward system in the retail client's store. The data is transferred to the neural network via an Internet or similar modem communications transfer. The neural network is linked to the database system from which trend analysis can be derived. The neural network can conduct statistical analysis of the consumer variables from the coupon data redemption point to predicts consumer behaviors. As a result, the database can generate coupons for consumers that are more likely to be used, improving consumer and retailer satisfaction.

These and other objects, features, and advantages of the present invention are readily apparent from the following detailed description of the best mode for carrying out the invention when taken in conjunction with the accompanying drawing.

BEST MODE FOR CARRYING OUT THE INVENTION

Figure 1:
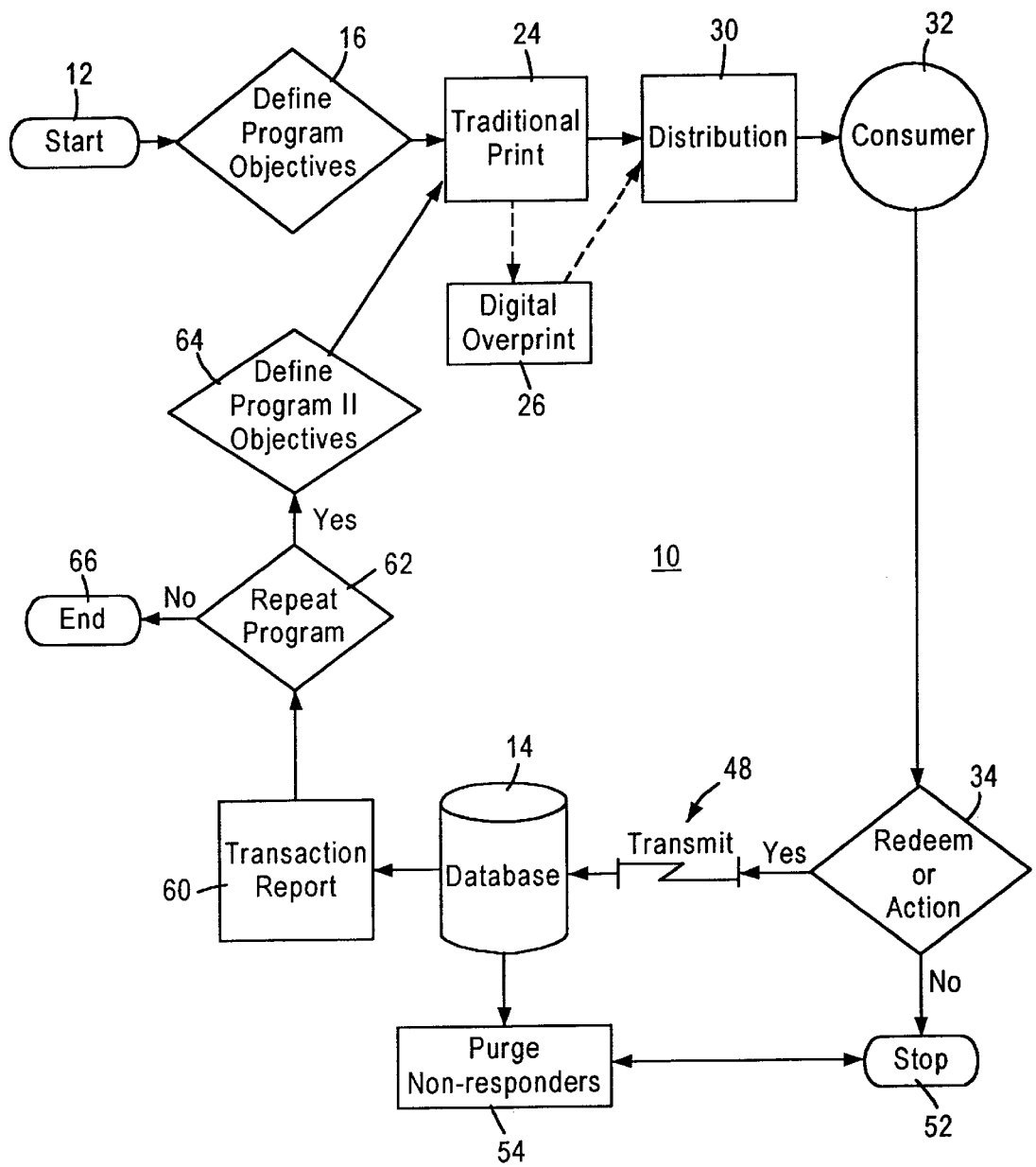
FIG. 1 is a block diagram of the system and method for analyzing coupon data redemption of the present invention.
Figure 2:
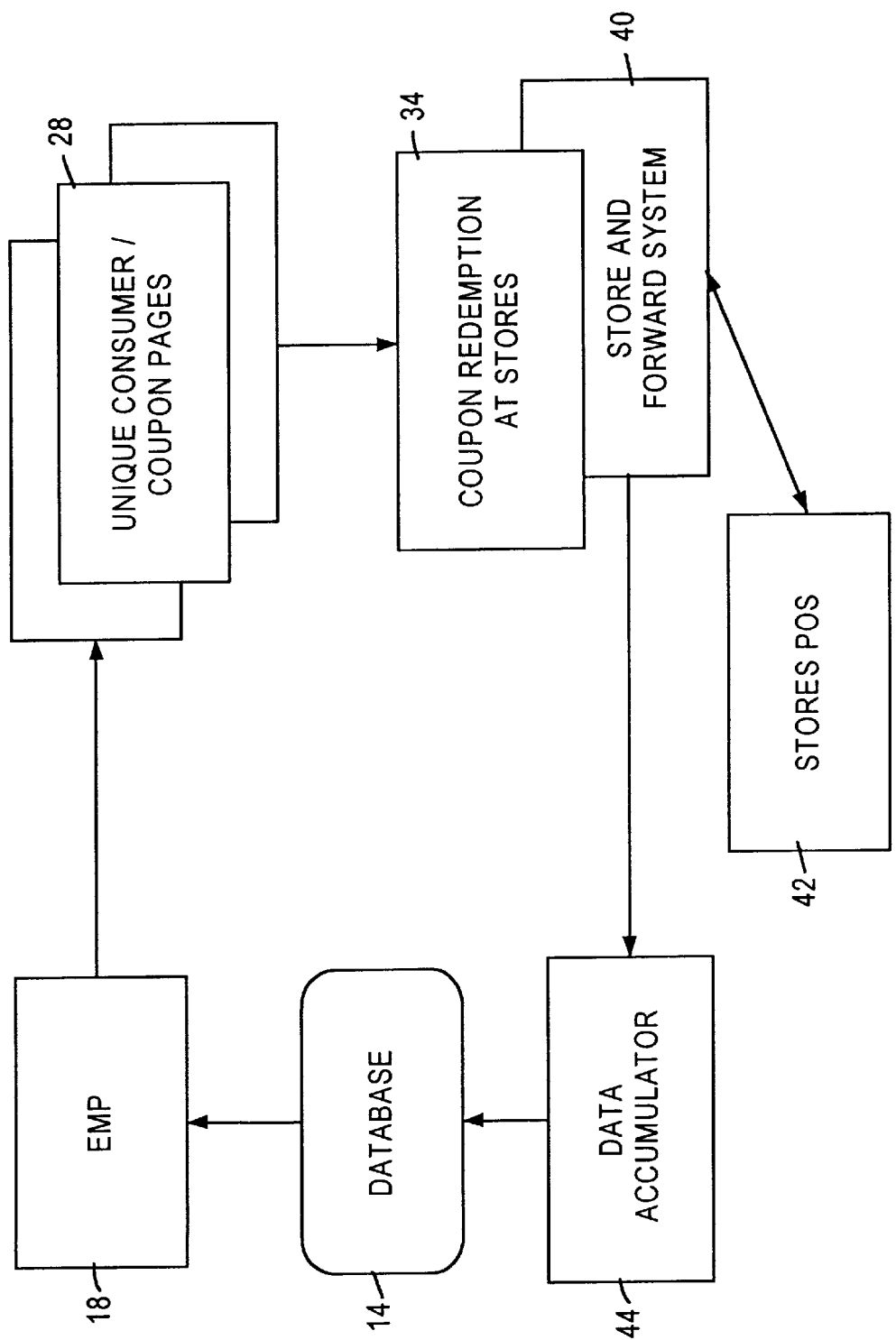
FIG. 2 is a block diagram of the process for generating the product coupons for the coupon data redemption system of the present invention.

As is seen in FIGS. 1 and 2, a block diagram represents the system and method for analyzing coupon redemption data of the present invention, which is generally labeled 10. The process usually starts with a request 12 by a direct market retailer or retail client to create advertisement coupons or flyers for specific products. The coupons requested by the direct market retailer or retail client will be sent to a group of potential consumers based on criteria selected by the retail client, including, but not limited to, geographic location of the consumer or demographic information about the consumer, including age, gender and household income. The database component 14 of coupon data redemption system 10 is a repository of information providing information about consumers for the distribution of coupons. The database 14 may reside on a computer hard disk or any other recordable media. The database 14 includes information about the target consumers, including but not limited to, consumer name, mailing address, demographics, purchasing habits, frequency of use of a given product and retailers frequented. The database 14 is actively updated by information retrieved from the redemption of coupons generated and can provide statistical reports analyzing the redemption data. A description of the updating of the database information and analysis of the redemption data process will be described in greater detail below.

Figure 3:
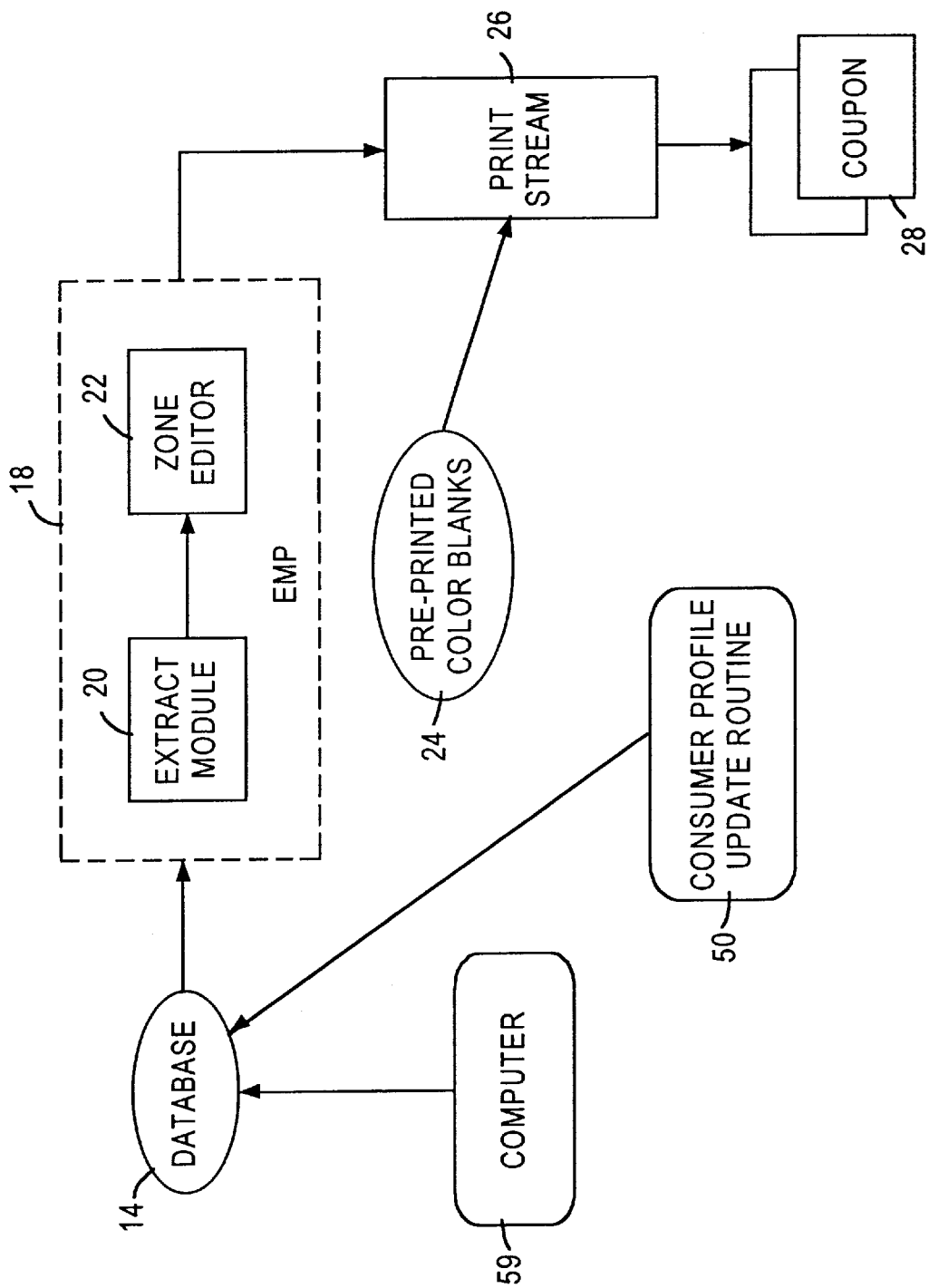
FIG. 3 is a block diagram of the data collection and redemption system of the present invention.

Block 16 generally indicates the definition of parameters for the coupon generating process for distribution to consumers. An operator defines program objectives 16 for the printing criteria for coupon generation based on data contained in database 14. Program objectives 16 can be defined either by a system operator, at the request of a retail client, or can be generated based on instructions provided by a computer program. Based on the criteria defined in program objectives 16, consumer and retail client data is extracted from the database component 14 by the extract module program application (EMP), generally indicated 18 in FIG. 3.

The EMP application 18 consists of two main modules: an extract module 20 and a zone editor 22. The EMP application 18 extracts consumer and retail client information from the database 14. This extraction allows the user to choose a range of consumers to target by region, store, consumer type or any of a number of possible differentiating factors. However, the exact consumer profile is set from feedback elements defined by an analysis conducted by the coupon redemption system of redemption data gathered from retail clients. A description of the analysis conducted by the coupon redemption system will be discussed in greater detail below. Elements from the database set by EMP application 18 are group elements, such as defining a coupon run for all stores within a given region and for consumers that are defined as moderate users of the focus product. The EMP application 18 is instructed by the EMP extract module 20 while the exact coupon data and consumer profile are dependent and thus instructed by the feedback from the resultant coupon data redemption. Once the data is gathered in the extract module component 20, it is verified against a duplication and address correction software package. The software package checks the addresses extracted from the database against U.S. Postal service records and ensures that duplicate coupons will not be generated. A discussion of the feedback elements defined by the analysis portion of the coupon data redemption system will be described in greater detail below.

Figure 7:
FIG. 7 is an example of a two-dimensional bar code generated by the coupon data redemption system of the present invention.

The extract module 20 of EMP application 18 generates a construction of a two dimensional Aztec coupon bar code 70 based on the resultant consumer and retail client information retrieved from the database 14, which is encoded on to pre-printed color background pieces 24. A representative sample of the Aztec two dimensional bar code 70 is illustrated in FIG. 7. The coupon tracking (2D) matrix symbology bar code developed by Welch Allyn is used to encode information from the database 14 on the pre-printed color background pieces 24. The method for generating the two dimensional bar codes is described in U.S. Pat. No. 5,591,956, issued Jan. 7, 1997, entitled "Two Dimensional Data Encoding Structure and Symbology for Use with Optical Readers," and is incorporated herein by reference.

Figure 10:
FIG. 10 is an example of the consumer information and bar codes generated on a coupon by the coupon redemption system of the present invention.
Figure 10:
Figure 10:
Figure 10:
Figure 10:
Figure 10:

As shown by FIG. 10 and the cited Welch Allyn Patent, the two-dimensional bar code symbol includes a finder structure, such as a center square and one or more nested squares having centers that approximately coincide with the center square. During scanning, a scanner detects the finder structure to determine the center of the symbol. The symbol also includes a symbol descriptor adjacent to the finder structure. The symbol descriptor indicates the maximum data capacity of the symbol and the quantity of encoded message data. The two-dimensional symbol further includes a reference grid. The reference grid extends throughout the symbol to facilitate the location of individual data elements with respect to the finder structure. The actual message data comprises an array of densely packed data blocks and check data blocks.

Standard one dimensional bar codes, including UPC A, UPC E, Code 39 and EAN do not provide a sufficient amount of data return for the system. The one dimensional bar codes maintain smaller amounts of data and are intended for non-variable uses such as product coding. The largest determining factor in the use of two dimensional bar codes rather than one dimensional bar codes is that the one dimensional bar codes are limited by size. For example, longer linear bar codes contain more data than shorter linear bar codes. However, in order to provide effective survey results, many codes would be longer than the coupon on which they are encoded. Table 1 details the specifics of the different types of one dimensional bar codes.

TABLE 1

One Dimensional Bar Code Specifications

| Code | Data Element | Alpha Content | Numeric Content |
|---|---|---|---|
| UPC A | Numeric | — | 12 |
| UPC E | Numeric | — | 6 |
| EAN 13 | Numeric | — | 13 |
| EAN 8 | Numeric | — | 8 |
| Code 39 | Alpha/Numeric | 43 | 43 |

In distinction, the Aztec two dimensional bar code is capable of carrying an extremely dense quantity of data relative to the square inches it occupies. The Aztec two dimensional code is capable of carrying the following data loads:

TABLE 2

Aztec Two Dimensional Bar Code Specifications

| Size | Modules | Alpha | Numeric | Data (bytes) |
|---|---|---|---|---|
| Small | 15 × 15 | 13 | 15 | 7 |
| Medium | 49 × 49 | 280 | 349 | 172 |
| Large | 151 × 151 | 2983 | 3727 | 1836 |

The Aztec two dimensional bar coding technique allows the system to include more information into the scannable area such that the analysis of the coupon redemption data will allow the database to learn more information regarding consumer purchasing habits. Further, it would be well to remember that one of the things that differentiates this product from others dealing with traditional bar code is the use of two dimensional Aztec bar codes. Aztec is designed to carry ten to one hundred times the data that the traditional bar code does in just slightly more space.

Certain aspects of the invention take advantage of the increased data transport capacity of the two-dimensional bar code. Each bar code includes offer information and an identifier of the specifically targeted consumer. In accord with one inventive feature, the two-dimensional bar code includes additional information from the database, which may be specific to the targeted consumer and/or the client. Examples of consumer specific information include the consumer's name, the consumer's mailing address and a relevant purchasing trend, such as the number of purchases the consumer has made at the client's place(s) of business. Examples of client specific information include the client's name, the client's geographic location, the client's type of business and a product description such as the type(s) of product(s) discounted. The resulting bar code makes each coupon impression unique, i.e. customized to the coupon offer and the consumer.

Referring back to FIG. 3, zone editor 22 of EMP application 18 takes the extracted data from database 14 and allows the user to build a field exemplar or data template for subsequent field printing. This field exemplar or data template is built upon the image of the pre-printed mailing piece 24 and provides for both variable field image and text data, including the Aztec two dimensional bar code generated by extract module 20. The zone editor component 22 is used to place the data extracted from database 14 on to the pre-printed color background pieces 24. Pre-printed color background pieces 24 generally consist of shells printed via the standard offset process using heat resistant, waxless inks. The zone editor 22 ensures the desired advertisements are placed in a particular position on the pre-printed color blanks based upon the cartographic page placement of X and Y axis elements. The page zone elements as defined by zone editor 22 are tagged in the corresponding record in database 14 for reference after the coupon has been redeemed.

When the exemplar is completed, the batch of (extracted page data from zone editor 22 creates a "distilled" page format in a portable document format (PDF) file format. The "distilled" page format coupons are tagged in the database 14 to denote that the coupon is prepared for printing, and subsequently, mailing. The tagging process allows the coupon redemption system to search for the record in the database corresponding to the tagged coupon during the redemption data analysis. The PDF page file is sent to the print stream component where the bar code and textual information is digitally overprinted 26 on the pre-printed color background pieces 24. In the preferred embodiment, the coupons are digitally overprinted using the Xerox 6135 printer, which handles about 5000 pages per hour during a standard print run. Each impression made is unique and customized to the given consumer and coupon within a given store and within a given region.

Referring additionally to FIG. 10, the output of the printing process 26 is a series of coupon or flyer pages 28, each of which is different from the next. Typically, the pages 28 contain field exemplar or data template information such as the mailing address of the consumer, generally indicated by reference numeral 29, and individualized to taste coupons with Aztec bar codes 70 that contain both the offer and the identification of the consumer. Additionally, the coupon pages may include other graphics, such as a map to the nearest retail client's store. As is generally indicated by block 30, the completed coupons or flyers 28 are either shipped to direct market retailers for distribution clients, or are alternatively mailed by the printers. The completed coupon pages may be folded as a self mailer and distributed to the intended consumer 34.

Figure 4:
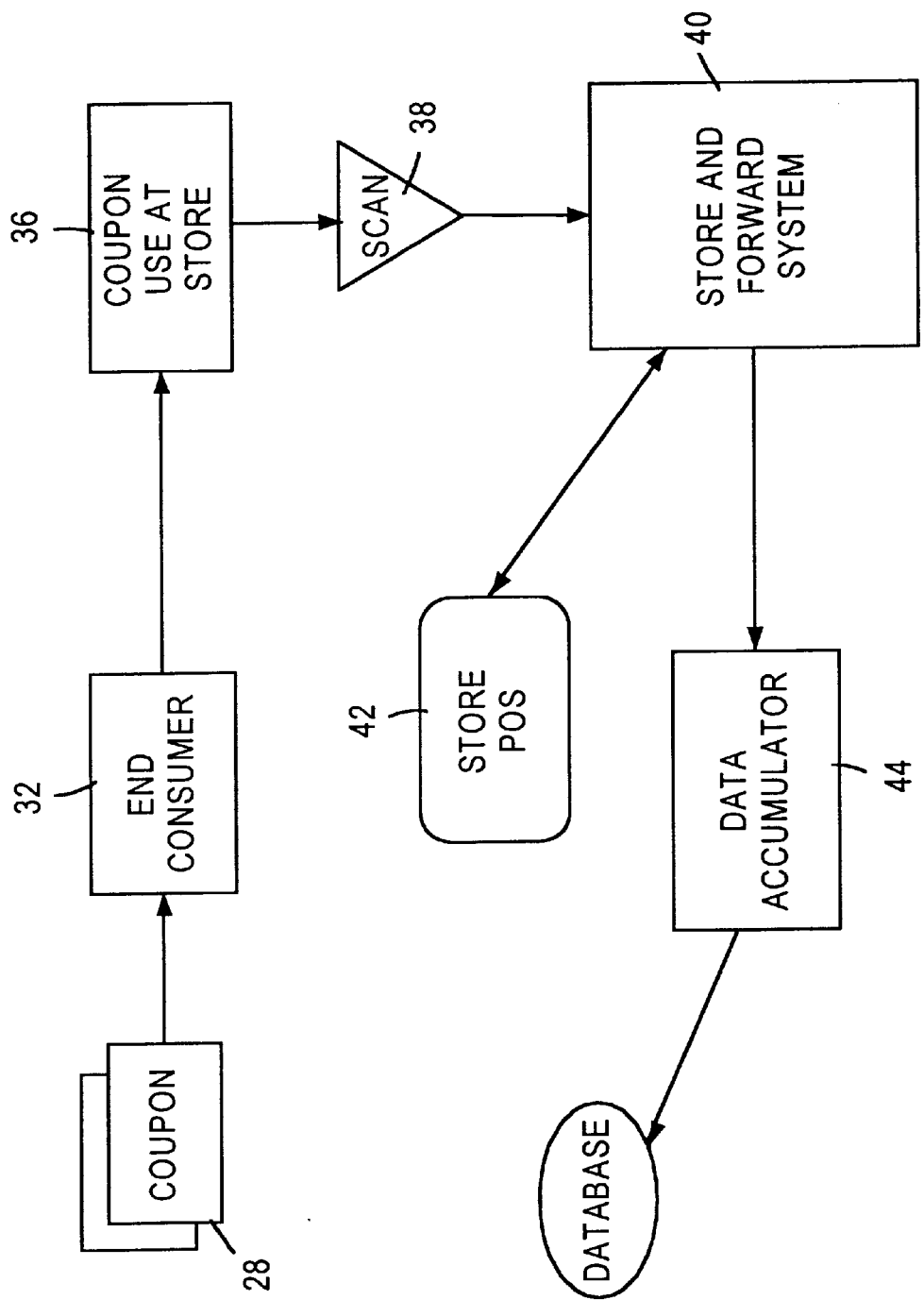
FIG. 4 is a block diagram of the data analysis and transfer system of the coupon data redemption system of the present invention.

Referring now to FIGS. 1 and 4, a description of the coupon redemption process of the coupon data redemption and analysis system is discussed in greater detail. The coupon redemption process, represented by block 34, is initiated by an end consumer 32 receiving coupons 28 generated by coupon data redemption system 10. As is best seen in FIG. 2, block 34 represents the coupon redemption at store operation, which includes a series of actions by both the consumer 34 and the retail store. The block representing the coupon redemption at store operation 34 includes the steps of using of the coupon at store 36 by the consumer 32, scanning of the coupon 38 by a retail sales representative and storing the scanned information in the store and forward system 40 at the retail store.

Referring back to FIG. 4, end consumer 32 self selects which coupons 28 will be redeemed for products sold at the retail client's store 36 and presents those coupons to the retail client at the time of purchase. The selected coupon 28 is scanned by a CCD based Welch-Allyn scanner 38 into the store and forward system 40. Data from the bar code 70 on coupon 28 is entered into a structured record contained within the store and forward system 40 while other consumer purchasing data, including, but not limited to, collateral purchases, gender of the consumer and amount of purchase, is collected from the retail client's point of sale system, which is generally indicated by block 42.

It should be noted that traditional one dimensional bar code scanners cannot be used with the Aztec two dimensional bar code symbology. The scan procedure 38 uses CCD based scanners developed by Welch Allyn that are specifically designed to read and decode the Aztec two dimensional bar codes. Examples of the types of the Welch Allyn scanners used to complete the decoding of the two dimensional bar codes are disclosed in U.S. Pat. No. 5,420,409, issued May 30, 1995 entitled "Bar Code Scanner Providing Aural Feedback," U.S. Pat. No. 5,463,214 issued Oct. 31, 1995 entitled "Apparatus for Optimizing Throughput in Decoded-Output Scanners and Method of Using Same," and U.S. Pat. No. 5,569,902 issued Oct. 29, 1996 entitled "Contact Two-Dimensional Bar Code Reader Having Pressure Actuated Switch," which are incorporated by reference herein.

The captured data from the bar code on coupon 28 may also be entered into the retail client's point of sale system 42 in addition to store and forward system 40. The store and forward system 40 may query the point of sale system 42 for ancillary sales data associated with redemption of coupon 28. An example of ancillary sales data includes whether the consumer purchased a drink or fries with the purchase of a hamburger when the coupon was redeemed. Certain other ancillary sales data may also be captured by observation such as the gender of the redeeming person, how many persons were in the party at the transaction time and what was the approximate age range of the redeeming party. The ancillary sales data in the retail client's point of sale system 42 may be included with the data record from store and forward system 40, which will be transferred back to data accumulator 44 of database component 14 to update consumer and retail client records in database 14.

Figure 6:
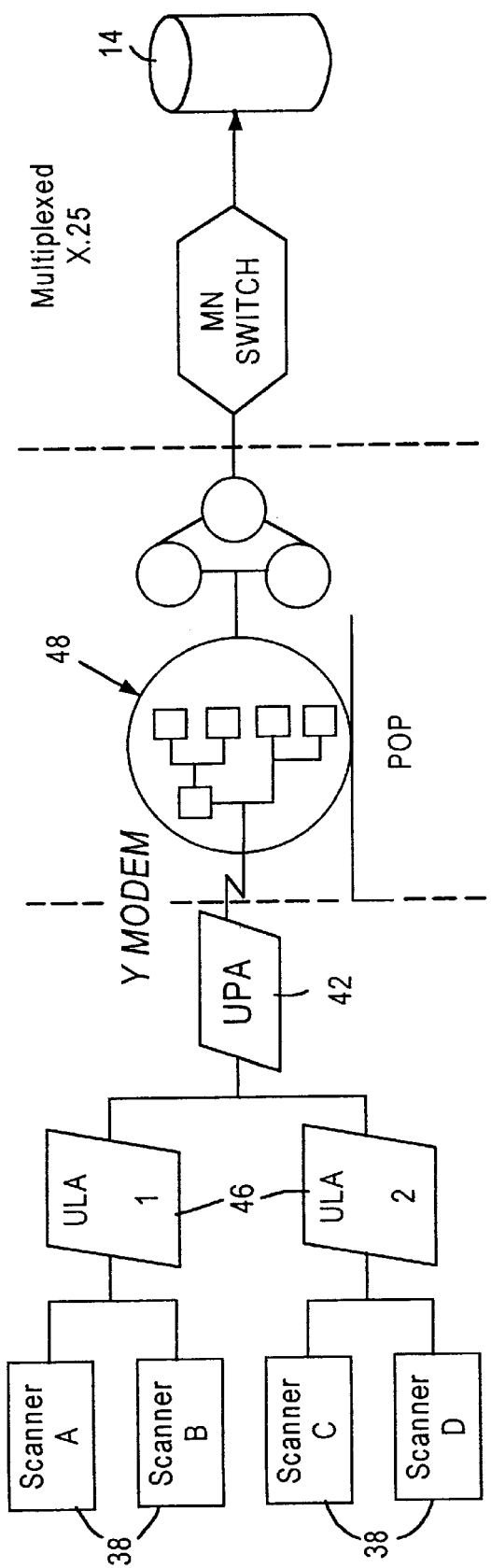
FIG. 6 is a flow diagram of the telecommunications system for transferring coupon data redemption from the retail store to the coupon data redemption system of the present invention.

Referring now to FIGS. 1 and 6, data is transferred from the store and forward system 42 to the data accumulator component 44 of database 14. Data from the two dimensional bar code 70 on coupon 28 is captured, by scanners 38 at the point of sale terminal in the retail store. The data from coupon 28 is uploaded from the point of sale terminal 42 to the store and forward system 40 through universal LAN adapter or router 46. Once the data is received by the store and forward system (UPA) 40, the data is transferred via direct dial modem 48 to the data accumulator 44 or database 14. In the preferred embodiment of the invention, data from store and forward system 40 is transferred via the Internet frequently to the data accumulator 44. The ability to transfer data via the Internet from the store and forward system 40 to the data accumulator 44 of database 14 allows near real time analysis of the consumer data at a particular retail store.

Figure 5:
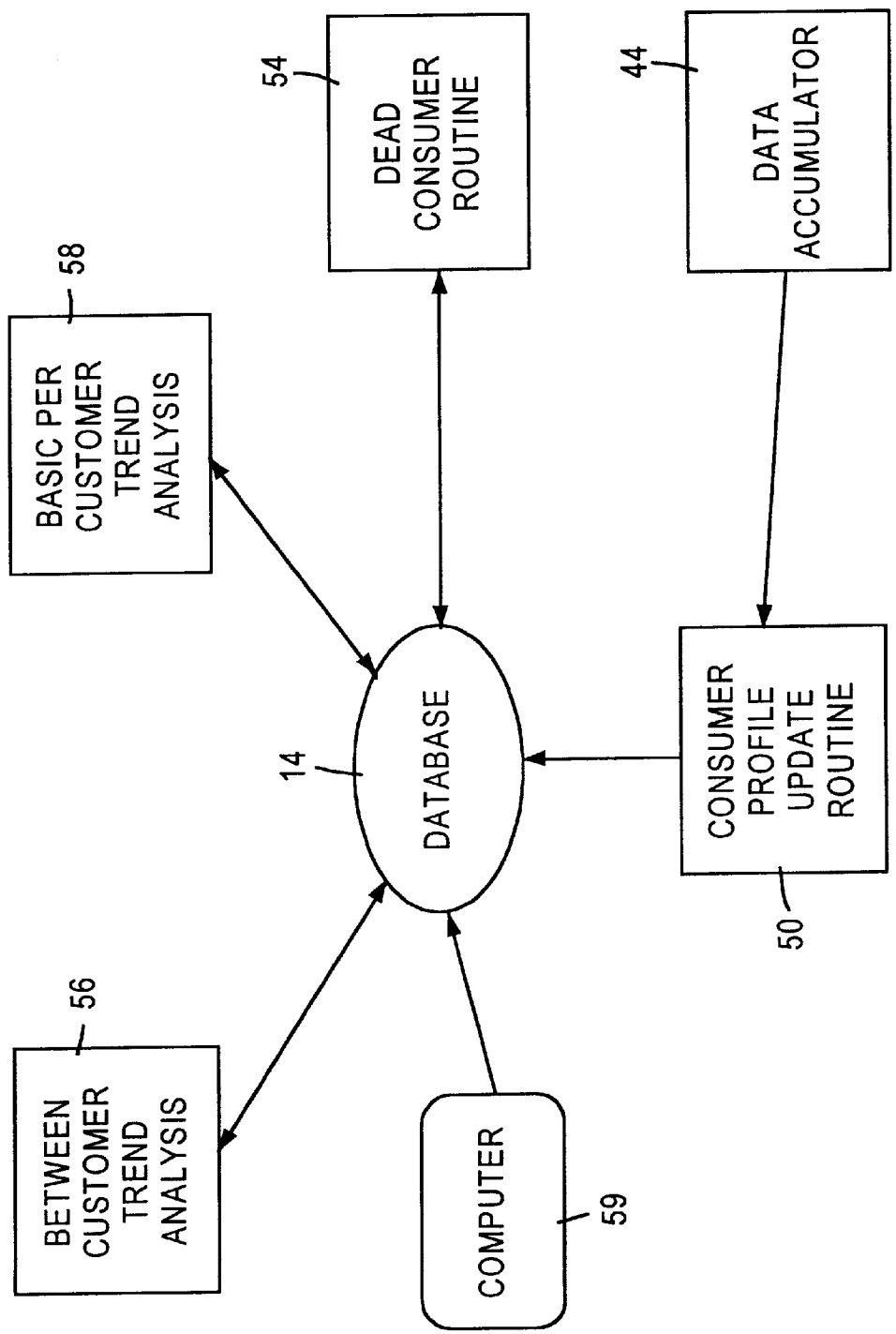
FIG. 5 is a flow diagram of the data analysis system of the neural network of the coupon data redemption system according to the present invention.
Figure 8:
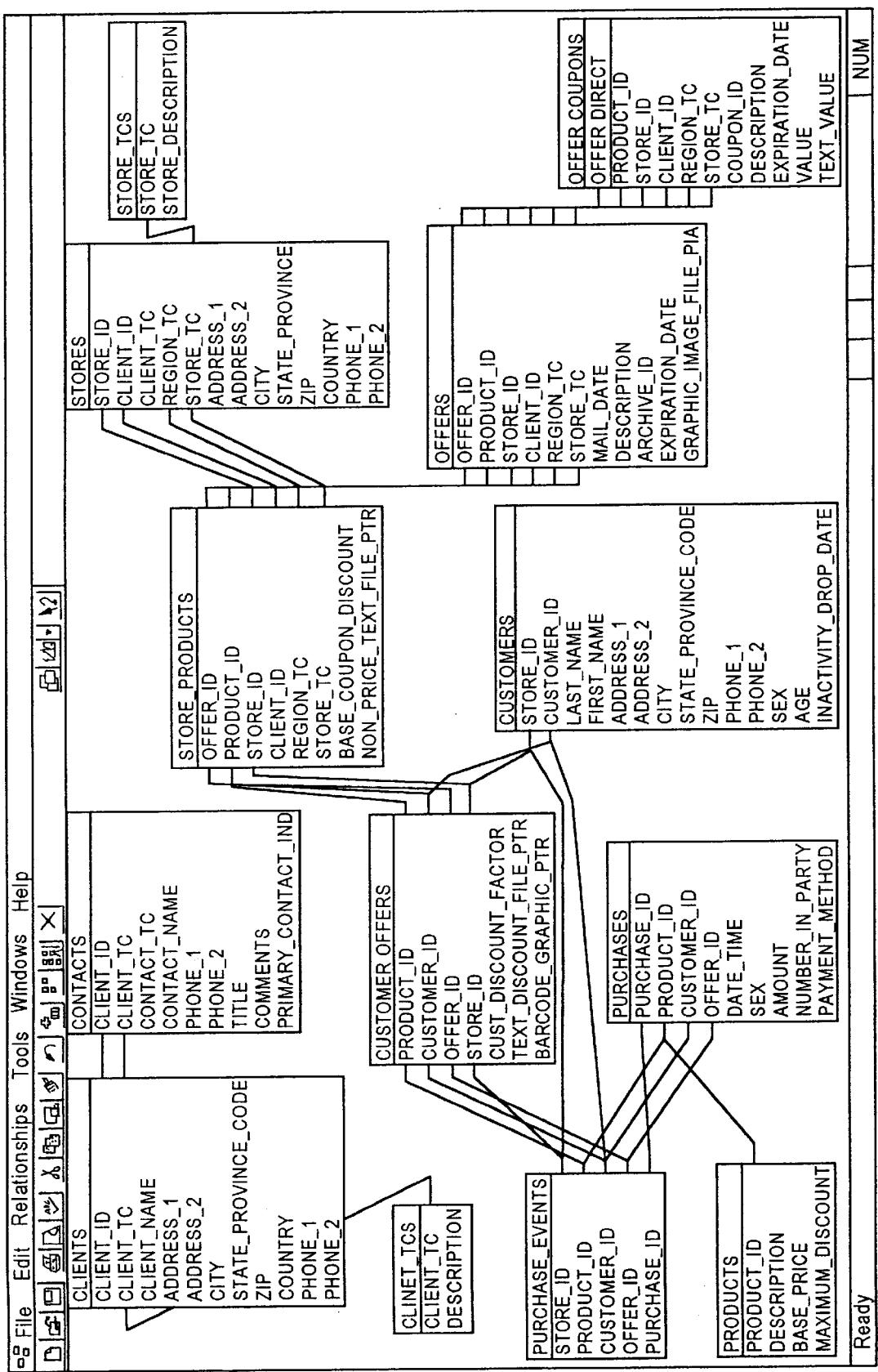
FIG. 8 is a block diagram representation of a portion of the consumer and product information database of the coupon data redemption system of the present invention.

Referring now to FIGS. 5 and 8, a description of the redemption data analysis portion of the coupon data redemption system is disclosed. Data accumulator 44 receives data from the store and forward system 40. After the data has been uploaded from data accumulator 44, the database information is updated via the consumer profile update routine 50. The consumer update profile routine 50 uploads the coupon redemption information into the database from the store and forward system 40. Each coupon contains unique data elements for each of the tables in database 14. For example, a hamburger chain has elements in the database that relate to hamburger toppings and side dishes. However, the basic consumer data elements are identifiers in the downloaded information to help the user locate the specific record to update in the database. The consumer data elements that are unique to each record are contained within specialized database table elements.

After the consumer profile update routine 50 has uploaded the coupon redemption data into the database 14, the analysis portion of the coupon data redemption system is activated to analyze the redemption data. The analysis portion of the coupon data redemption system is a parallel adaptive self-arborizing network that is capable of continuous learning based on the inputs into the system. The analysis portion of the coupon data redemption system engages the coupon redemption data against several algorithms which in turn drive the analysis of variables to determine the presence of consumer purchasing trends, including, but not limited to, group buying behaviors and individual price sensitivity. The system is capable of predicting future activity based on the history acquired through past analysis as well as interpreting current data at sub-statistical levels. The analysis portion of the coupon data redemption system will allow the system to identify purchasing trends for consumers prior to the trends being detected via normal or group statistics.

The analysis elements of the system include a dead consumer routine, represented by block 54, between consumer trend analysis, represented by block 56, and basic consumer trend analysis, represented by block 58. The dead consumer routine reviews the database list to determine which coupons have not been responded to, as indicated at 52 on FIG. 1. If a consumer does not respond to the coupon incentives, the consumer name can be removed from the database so further coupons will not be printed for the consumer for the advertised product. This is a benefit to retailers, as they are able to save advertising money that would potentially be spent on printed coupons that would not be redeemed. The between consumer trend analysis module, indicated as 56 on FIG. 5, allows the program to infer consumer purchasing behaviors over a selected group of consumers. The basic consumer trend analysis program 58 allows the coupon data redemption system 10 to infer consumer purchasing trend data within a database defined consumer purchasing level. The analysis elements 54, 56, 58 query elements included in the database component 14. A representative sample of some of the fields and elements in the database component 14 are shown in FIG. 8. The analysis portion of the coupon data redemption system 10 further includes a computer or network connection 59 to the database component 14 to allow operator or program intervention in the analysis cycle.

Referring back to FIG. 1, following analysis of the data by any one of analysis elements 54, 56, 58 or 59, the database 14 will send the resultant data to transaction reporting component 60. The transaction reporting component 60 supplies reporting features which will indicate to individual franchises potential marketing strategies for consumers within their markets, as well as macro information based on the results of the promotions and the performance of the industry. The macro industry information is presented in a generic format so as not to disclose elements on an individual basis.

Figure 9:
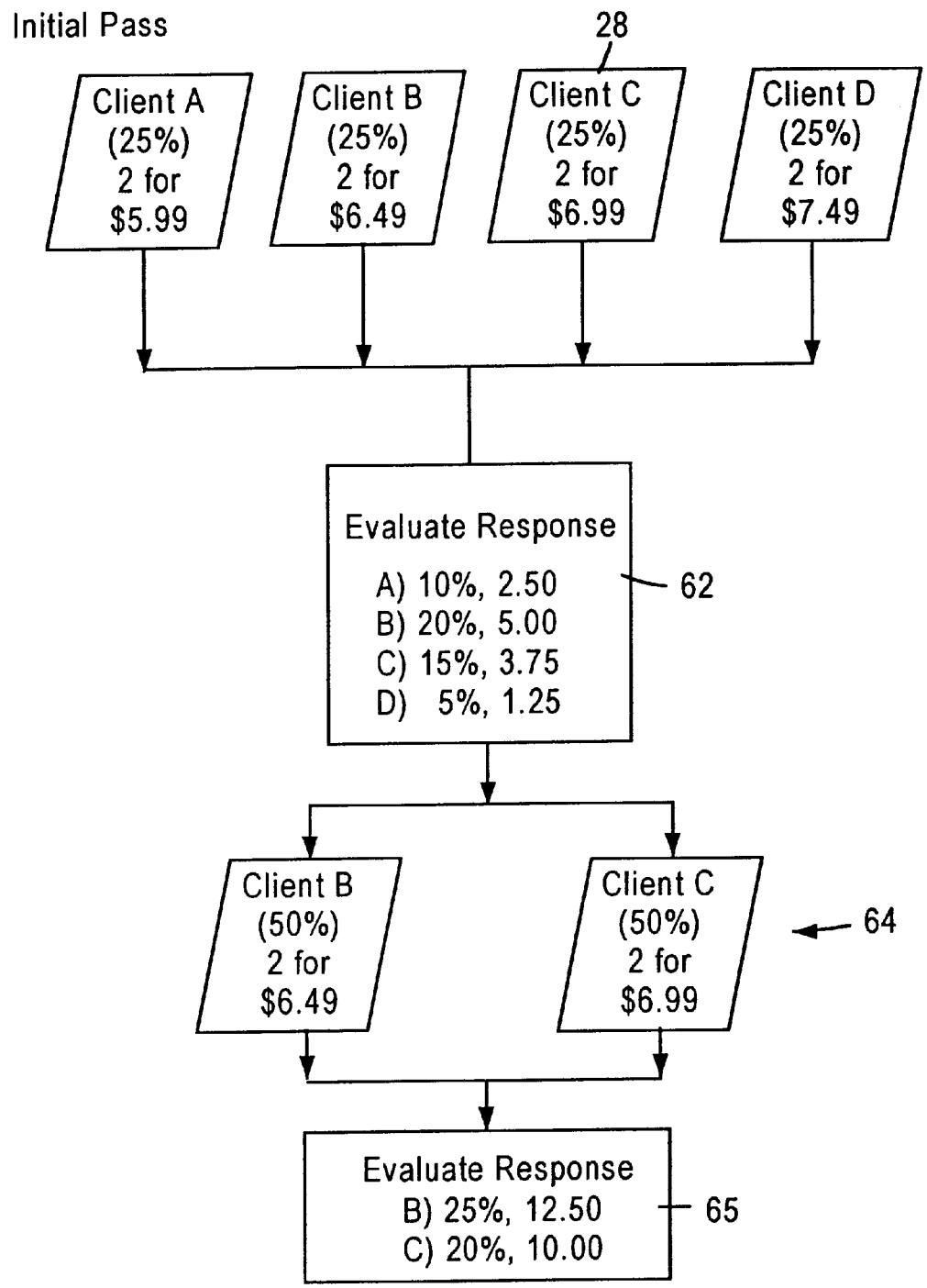
FIG. 9 is a flow diagram of an example redemption analysis conducted by the data analysis system of the coupon data redemption system according to the present invention.

Referring additionally to FIG. 9, upon completing the transaction reporting, the resultant consumer data reports are reviewed to determine the consumer response rate to the coupon promotion, as indicated by block 62. Based on the analysis of the coupon redemption data, the system 10 will define a revised set of advertising program objectives 64 that will be used to define the next set of instructions for the coupon promotional campaign, the results of which will thereby be reviewed, generally indicated by block 65, to determine the success of the continued coupon promotional campaign. Alternatively, if the results of the previous promotional campaign have not been successful or the direct market retailer cancels the promotional campaign, the program will execute a decision 66 to stop the distribution of the resultant data and the program cycle will end.

While the embodiments of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. A system for analyzing coupon redemption data, the system comprising:

a parallel adaptive self-arborizing network, the parallel adaptive network including a database component having a database containing consumer and client data;

an extract module in communication with the database component, wherein the extract module retrieves the consumer and client data from the database in response to a first set of program objectives;

a zone editor for creating at least one redeemable coupon, wherein the zone editor creates a data template including at least one machine readable code containing both consumer and client data extracted from the database by the extract module;

a data recovery system, the data recovery system including at least one point of sale terminal and a store and forward system, wherein the at least one point of sale terminal scans the at least one machine readable code of the at least one redeemable coupon to retrieve consumer and client data, wherein the store and forward system is in communication with the at least one point of sale terminal to retain the consumer and client data from the at least one redeemable coupon;

a data accumulator in communication with the database component of the parallel adaptive network, wherein the data accumulator receives consumer and client data transmitted by the data recovery system to upload into the database; and a redemption data analysis component of the database of the parallel adaptive network, wherein the redemption data analysis component of the database conducts an analysis of the consumer and client data retrieved from the store and forward system to determine current consumer purchasing trends and predict future consumer purchasing activity, wherein the redemption data analysis component of the database is capable of continuous learning based on the consumer and client data retrieved from the at least one data recovery system, wherein:

the at least one machine readable code generated by the zone editor is a two-dimensional bar code containing information as to an offer made via the coupon as well as the extracted consumer and client data to be scanned into the data recovery system for transmission into the database component of the parallel adaptive network, the consumer data extracted from the database to create the two-dimensional bar code comprises at least one of a consumer name, a consumer mailing address and a consumer purchasing trend; and the information as to the offer, the client and the consumer contained in the two-dimensional bar code makes the coupon unique.

2. The system of claim 1 wherein the redemption data analysis component of the consumer and client data comprises components for:
    performing a consumer profile routine to review consumer and client data to verify existing consumer and client data in the database;
    analyzing the consumer and client data from the at least one redeemable coupon to determine consumer purchasing behaviors over a selected group of consumers;
    analyzing the consumer and client data from the at least one redeemable coupon to determine consumer purchasing trends within a defined consumer purchasing level;
    performing a dead client routine to remove data for the at least one consumer that did not redeem the at least one redeemable coupon;
    generating at least one report to detail the analysis of the consumer and client data;
    adapting the data redemption analysis component to learn future consumer purchasing activities based on the results of the at least one report; and
    creating a second set of program objectives based on the at least one report to generate at least one second redeemable coupon to be distributed to a consumer for redemption.

3. The system of claim 2 wherein the redemption data analysis component of the parallel adaptive network further includes a computer attached to the database component to allow for manual intervention in the redemption data analysis.

4. The system of claim 2 wherein the redemption data analysis component of the parallel adaptive network further comprises an output device for generating the at least one transaction report of the consumer and client data from the at least one redeemed coupon.

5. The system of claim 1 wherein the zone editor tags a corresponding record to the at least one coupon in the database component of the parallel adaptive network as distributed to the consumer.

6. The system of claim 1 wherein the system further comprises an output device for generating the data template on the at least one document to create the at least one redeemable coupon.

7. The system of claim 6 wherein the zone editor further comprises a system for creating a distilled page format containing both the consumer and client data in the data template and a coupon template containing a coupon design, wherein the distilled page format is digitally overprinted on the at least one document to create the at least one redeemable coupon.

8. The system of claim 1 further comprising a component for manually entering demographic information about the at least one consumer at the time of the redemption of the at least one coupon into the at least one point of sale terminal.

9. The system of claim 1 wherein the consumer and client data is transmitted directly from the at least one data recovery system to the data accumulator component of the parallel adaptive network, wherein the at least one data recovery system is in communication with the data accumulator on the Internet.

10. The system of claim 1 wherein the consumer and client data is transmitted directly from the store and forward system to the data accumulator component of the parallel adaptive network, wherein the store and forward system and the data accumulator communicate by a direct dial modem transfer.

11. The system of claim 10 wherein the store and forward system and the data accumulator communicate through a direct Internet connection for real time transfer and analysis of the coupon redemption data.

12. The system of claim 1, wherein the client data extracted from the database to create the two-dimensional bar code comprises at least one of: a client name, the type of client business, the client's geographic location and at least one product description.

13. A method of distributing a coupon for redemption and analysis of redemption data, comprising the steps of:
    selecting one of a plurality of consumers for receipt of a redeemable coupon and providing an identification of the selected consumer;
    extracting at least one additional item of analyzable information about a trait of the selected consumer from a database of information regarding the plurality of consumers;
    extracting data defining a selected coupon offer from a database of coupon offers;
    compiling a coupon message comprising the identification of the selected consumer, the at least one additional item of analyzable information, and the data defining the selected coupon offer;
    encoding the coupon message into a two-dimensional bar code;
    compiling the two-dimensional bar code with other data to form a unique redeemable coupon; and
    distributing the unique redeemable coupon to the selected consumer.

14. A method as in claim 13, wherein the encoding step forms a two-dimensional bar code comprising:
    a substantially centralized finder structure;
    a symbol descriptor adjacent to the finder structure; and
    a plurality of blocks of data carrying the coupon message.

15. A method as in claim 14, wherein the two-dimensional bar code formed in the encoding step comprises an Aztec bar code.

16. A method as in claim 13, wherein the at least one additional item of information about a trait of the selected consumer comprises a name of the selected consumer, a mailing address of the selected consumer or a purchasing trend of the selected consumer.

17. A method as in claim 13, wherein the coupon message further comprises client data comprising a client name, type of client business, client geographic location or a product description.

18. A method as in claim 13, wherein the selecting of the one consumer is based at least in part on prior purchase history of the one consumer.

19. A method of distributing a coupon for redemption, comprising the steps of:
    selecting one of a plurality of consumers for receipt of a redeemable coupon and providing an identification of the selected consumer;
    extracting data defining a selected coupon offer from a database of coupon offers;
    compiling a coupon message comprising the identification of the selected consumer and the data defining the selected coupon offer;
    encoding the coupon message into a two-dimensional bar code comprising a substantially centralized finder structure and a plurality of blocks of data carrying the coupon message;
    compiling the two-dimensional bar code with other data to form the redeemable coupon; and distributing the redeemable coupon to the selected consumer.

20. A method as in claim 19, wherein the two-dimensional bar code formed in the encoding step further comprises a symbol descriptor adjacent to the finder structure and a reference grid for use in location of individual data blocks with respect to the finder structure during subsequent redemption scanning of the two-dimensional bar code.

21. A method as in claim 20, wherein the two-dimensional bar code comprises an Aztec bar code.

22. A method as in claim 20, further comprising extracting at least one additional item of information about a trait of the selected consumer from a database of information regarding the plurality of consumers, wherein the compiling step includes the at least one additional item of information in the coupon message.

23. A method as in claim 22, wherein the at least one additional item of information comprises a name or a mailing address or a purchasing trend of the selected consumer.

24. A method as in claim 20, further comprising extracting at least one item of information regarding a client from a database of client information, wherein the compiling step includes the at least one item of information regarding the client in the coupon message.

25. A method as in claim 24, wherein the at least one item of information regarding the client comprises a client name, type of client business, client geographic location or a product description.

26. A method as in claim 20, wherein the selecting of the one consumer is based at least in part on prior purchase history of the one consumer.

* * * * *